United States Patent
Favero et al.

(10) Patent No.: US 10,889,512 B2
(45) Date of Patent: Jan. 12, 2021

(54) METHOD FOR TREATING AQUEOUS EFFLUENT

(71) Applicant: S.P.C.M. SA, Andrezieux-Boutheon (FR)

(72) Inventors: Cédrick Favero, Andrezieux (FR); Morgan Tizzotti, Andrezieux (FR)

(73) Assignee: S.P.C.M. SA, Andrezieux-Boutheon (FR)

( * ) Notice: Subject to any disclaimer, the term of this patent is extended or adjusted under 35 U.S.C. 154(b) by 165 days.

(21) Appl. No.: 15/781,960

(22) PCT Filed: Dec. 7, 2016

(86) PCT No.: PCT/EP2016/080006
§ 371 (c)(1),
(2) Date: Jun. 6, 2018

(87) PCT Pub. No.: WO2017/097799
PCT Pub. Date: Jun. 15, 2017

(65) Prior Publication Data
US 2018/0362371 A1 Dec. 20, 2018

(30) Foreign Application Priority Data
Dec. 7, 2015 (FR) ..................... 15 61918

(51) Int. Cl.
*C02F 1/56* (2006.01)
*C02F 1/38* (2006.01)
*B01D 21/01* (2006.01)
*C02F 1/00* (2006.01)
*C02F 103/10* (2006.01)

(52) U.S. Cl.
CPC ............. *C02F 1/56* (2013.01); *B01D 21/01* (2013.01); *C02F 1/001* (2013.01); *C02F 1/38* (2013.01); *C02F 2103/10* (2013.01)

(58) Field of Classification Search
CPC ...................................... C02F 1/56
See application file for complete search history.

(56) References Cited

U.S. PATENT DOCUMENTS

| | | | |
|---|---|---|---|
| 8,322,911 B2 | 12/2012 | Pich et al. | |
| 8,764,974 B2 | 7/2014 | Cross et al. | |
| 2011/0253599 A1* | 10/2011 | Cross | C10G 1/047 208/390 |
| 2014/0080945 A1 | 3/2014 | Andermann, Jr. et al. | |
| 2014/0238943 A1* | 8/2014 | Favero | C02F 1/56 210/734 |
| 2018/0127290 A1 | 5/2018 | Utting | |

FOREIGN PATENT DOCUMENTS

| | | |
|---|---|---|
| CL | 2017-02740 | 10/2017 |
| WO | WO-2012125918 | 9/2012 |
| WO | WO-2013052326 | 4/2013 |
| WO | WO-2016/174582 | 11/2016 |

OTHER PUBLICATIONS

Preliminary Search Report for FR 1561918, completed Jul. 29, 2016.
International Search Report for PCT/EP2016/080006, dated Feb. 2, 2017.
Written Opinion of the International Search Authority for PCT/EP2016/080006, dated Feb. 2, 2017.

* cited by examiner

*Primary Examiner* — Peter Keyworth
(74) *Attorney, Agent, or Firm* — B. Aaron Schulman, Esq.; Stites & Harbison, PLLC

(57) ABSTRACT

The invention concerns the treatment of mine tailings in the form of aqueous effluents comprising solid particles. With the method of the invention it is possible to separate all or part of the water from an aqueous effluent comprising solid particles. This method comprises (a) adding at least one sulfonated dispersing agent to the effluent, then (b) adding at least one agent to flocculate the solid particles.

The invention also relates to a composition comprising an aqueous effluent comprising dispersed, flocculated solid particles. Preferably it relates to a composition comprising an aqueous effluent comprising solid particles, at least one sulfonated dispersing agent and at least one agent to flocculate solid particles.

10 Claims, No Drawings

METHOD FOR TREATING AQUEOUS EFFLUENT

The invention concerns the treatment of mine tailings in the form of aqueous effluents comprising solid particles. With the method of the invention it is possible to separate all or part of the water from an aqueous effluent comprising solid particles. This method comprises (a) adding at least one sulfonated dispersing agent to the effluent, then (b) adding at least one agent to flocculate the solid particles.

The invention also relates to a composition comprising an aqueous effluent comprising dispersed, flocculated solid particles. Preferably it relates to a composition comprising an aqueous effluent comprising solid particles, at least one sulfonated dispersing agent and at least one agent to flocculate solid particles.

Numerous mining extraction processes produce tailings in the form of aqueous effluents comprising solid particles. For example, the production of hydrocarbons from bituminous or oil sands leads to such mine tailings. The management of mine tailings is therefore a major challenge in the mining industry, in particular since the start of production from oil-bearing sands. It is therefore incumbent upon operators to determine how to remove these by-products in secure and efficient manner. The challenge is all the greater on account of the large scale of mining operations from oil sands.

In general, mining operations also produce such tailings or waste materials when extracting ores for the production of coal, diamonds, phosphate or different metals e.g. aluminium, platinum, iron, gold, copper, silver, etc. Such tailings may also result from the processing of ores or from industrial or washing processes.

Mine tailings may be in different forms, in particular a sludge. In general, they are suspensions of solid particles in water.

In general, mine tailings from oil sands are composed of water, clay, sand and residual hydrocarbons derived from the mine extraction process.

Up until now, current practice in the industry has been to pump the tailings into vast settling ponds. The heaviest material, mainly sand, deposits at the bottom whilst the water rises to the surface and can be recycled. The intermediate layer known as mature fine tailings (MFTs), is generally composed of 70% water and 30% fine clay particles. Evidently, the layer of mature fine tailings could take centuries to solidify. The continuing development of mining operations has required the creation of an increasing number of ever larger settling ponds.

Therefore, the mineral sludge produced by physical or chemical treatment methods of oil sands is stored in open-air basins, ponds, holding dams or semi-liquid embankments. These large volumes of stored sludge therefore create a true hazard, in particular in the event of rupture of dykes.

Having particular regard to technical, environmental or regulatory requirements, it is henceforth necessary to find means to accelerate or improve the efficacy of transforming mature fine tailings to a firm deposit than can subsequently be reclaimed.

Land reclamation after mining operations has become compulsory under environmental rules and regulations.

There is also a need for accelerated treatment of mine tailings, by increasing the rate of sedimentation thereof for efficient recycling of water and to reduce waste volume.

Continuous treatment methods are also needed.

There is also a need to have treatment methods available that allow the overcoming or reducing of problems related to the handling and transport of aqueous effluent, in particular when the treatment of aqueous effluent is performed at a site remote from the production site. It frequently happens that ore or bituminous sand causing the aqueous effluent is mined at a site remote from the site where the aqueous effluent is treated. The high viscosity of the aqueous effluent may increase problems related to the handling or transport of this effluent. This high viscosity also leads to an increase in energy consumption at the time of handling or transport of this effluent.

The incorporation of other elements, in particular elements comprising flocculating agents also gives rise to problems on account of the high viscosity of the aqueous fluid to be treated. The quantities or mixing times of flocculating agent to be integrated may also be increased.

In addition, dilution of the aqueous fluid allowing the viscosity thereof to be reduced leads to larger quantities of water taken from the surrounding natural environment. Said dilution also leads to an increase in the total volume of aqueous fluids to be treated.

In general, the separation and recycling of all or part of the water contained in mining aqueous effluent are essential objectives for a mining operation. For example, methods for treating aqueous effluent containing solid particles essentially aim at improving the yield of water separation, particularly for the purpose of recycling the separated water and to allow easy handling of the final residue. The increase of this yield, net water release (NWR), is a major target of methods to treat aqueous effluent containing solid particles.

Methods are known for the physical treatment of these mine tailings, e.g. centrifugation, filtration, electrophoresis and electrocoagulation.

There is also an emergence of chemical methods. For example, methods are known involving the addition of chemical products such as sodium silicate, organic flocculants, inorganic coagulants, oxidization agents, reducing agents or carbon dioxide. The use is also known of synthetic or natural polymers as coagulants or flocculants, to separate the solids from the liquid.

In addition, dispersants are known to be products capable of fluidifying the most concentrated aqueous suspensions, to facilitate transport thereof. However, the use of such dispersing products leads to problems at the time of subsequent use of flocculating agents. This is because the addition of flocculating agents to suspensions comprising dispersants is inefficient; the solid particles in the suspension are not flocculated. Therefore, conventional flocculants of anionic polyacrylamide type lose their efficacy when mixed with said dispersed suspensions.

It is therefore necessary to have a method using a dispersing agent that does not affect flocculation.

As a result, although techniques for treating mine tailings exist, these techniques do not provide a fully efficient solution to the problems encountered, in particular from a technical, environmental or public order viewpoint.

It is consequently necessary to have methods available that allow solutions to be found for all or part of the problems encountered in prior art methods.

The invention therefore provides a method for treating an aqueous effluent comprising solid particles, comprising:
 (a) adding at least one sulfonated dispersing agent to the effluent; then
 (b) adding at least one agent to flocculate the solid particles.

The treatment method of the invention therefore comprises:
 (a) dispersing the solid particles in the aqueous medium by means of the sulfonated dispersing agent; then (b) flocculating the solid dispersed particles by means of the flocculating agent.

According to the invention, the effluent is advantageously a mine extraction effluent, preferably mine extraction effluent from bituminous or oil sands. In addition to solid particles, the effluent comprises water. It may comprise sand, clay and water or else sand, clay, water and residual bitumen.

In general, the aqueous effluent of the invention comprises 5 to 70% by weight, preferably 20 to 50% by weight, more preferably 30 to 40% by weight of solid particles, particularly mineral particles.

The effluent treated according to the method of the invention may comprise different tailings. These tailings may be fresh tailings or fine tailings. Preferably it is an effluent comprising mature fine tailings (MFTs), in particular an effluent comprising mature fine tailings (MFTs) containing clay in an amount ranging from 5 to 70% by weight.

In general, the aqueous effluent derived from mining operations of bituminous sand and treated according to the invention may also contain residual bitumen. Residual bitumen is then present in a small amount, generally in an amount lower than 5% by weight of aqueous effluent.

According to the invention the aqueous effluent comprising fresh tailings, fine tailings, mature fine tailings or mature fine tailings containing clay in an amount ranging from 5 to 70% by weight, and comprising solid particles, is preferably an aqueous effluent leaving a primary chamber for bitumen separation. By primary chamber for bitumen separation it is meant to designate a separation chamber allowing separation of most of the bitumen from the mining aqueous effluents comprising solid particles.

The method of the invention comprises the addition of at least one sulfonated dispersing agent to the effluent.

Preferably, the sulfonated dispersing agent is added in an amount by weight ranging from 10 to 10 000 ppm, preferably from 200 to 5 000 ppm, more preferably from 500 to 2 000 ppm, relative to the quantity of effluent. Also preferably, the sulfonated dispersing agent is added in an amount by weight ranging from 10 to 10 000 g, preferably from 200 to 5 000 g, more preferably from 500 to 2 000 g per tonne of effluent.

Advantageously, the sulfonated dispersing agent allows fluidification of the effluent, in particular a reduction in its viscosity, especially to facilitate transport thereof. According to the invention, the molecular weight of the sulfonated dispersing agent may vary quite widely, in particular as a function of the effluent to be treated or as a function of the sulfonated dispersing agent as such. In general, the sulfonated dispersing agent has a molecular weight ranging from 1 000 to 50 000 g/mol, preferably from 5 000 to 30 000 g/mol, more preferably from 10 000 to 25 000 g/mol.

Preferably, the sulfonated dispersing agent is selected from among homo- or co-polymers of 2-acrylamido-2-methylpropane sulfonic acid (ATBS or acrylamide tertiary butyl sulfonic acid), vinylsulfonic acid, styrenesulfonic acid, naphthalenesulfonic acid, allylsulfonic acid or one of the water-soluble salts thereof. It may also be selected from among the co-polymers of:

2-acrylamido-2-methylpropane sulfonic acid, vinylsulfonic acid, styrenesulfonic acid, naphthalenesulfonic acid, allylsulfonic acid or the water-soluble salts thereof; and at least one non-ionic monomer selected from among acrylamide; methacrylamide; N-monoderivatives of acrylamide; N-monoderivatives of methacrylamide; N,N-derivatives of acrylamide; N,N-derivatives of methacrylamide; acrylic esters; methacrylic esters; N-vinylformamide and N-vinylpyrrolidone.

The water-soluble salts of these monomers are typically salts of an alkaline metal, an alkaline-earth metal or ammonium.

Preferably, the sulfonated dispersing agent can be selected from among poly 2-acrylamido-2-methylpropane sulfonic acid, polyvinyl sulfonic acid, polystyrene sulfonic acid, polynaphthalene sulfonic acid, polyallyl sulfonic acid or mixtures thereof.

Particularly preferably, the sulfonated dispersing agent can be selected from among the copolymers prepared from non-ionic monomers, preferably used in an amount ranging from 0.01 to 90 mol %.

In addition to the sulfonated dispersing agent, the method of the invention uses a flocculating agent. According to the invention, flocculation of the solid particles contained in the aqueous effluent is a physicochemical process during which the solid particles in suspension in the aqueous effluent agglomerate to form flocs. These flocs are particles of larger size which generally settle much faster than the primary particles from which they are formed.

Preferably, for the method of the invention, the flocculating agent is added in an amount by weight ranging from 10 to 10 000 ppm relative to the quantity of solid particles contained in the aqueous effluent. From a practical viewpoint, it is added in an amount ranging from 10 to 10 000 g per tonne of solid particles contained in the aqueous effluent.

Also preferably, the flocculating agent has a molecular weight ranging from 3 to 40 million g/mol. Also, the molecular weight of the flocculating agent may range from 5 to 30 million g/mol.

Numerous compounds can be used as flocculating agent for the method of the invention. In particular these may be a polymer prepared from at least one non-ionic monomer, or a polymer prepared from at least one anionic monomer, even a polymer prepared from at least one cationic monomer. Preferably, it is a copolymer prepared from at least one non-ionic monomer and from at least one anionic monomer, e.g. in a molar proportion of 70% of at least one non-ionic monomer and 30% of at least one anionic monomer.

Preferably according to the invention, the flocculating agent is a polymer prepared from at least one non-ionic monomer selected from among acrylamide; methacrylamide; N-monoderivatives of acrylamide; N-monoderivatives of methacrylamide; N,N-derivatives of acrylamide; N,N-derivatives of methacrylamide; acrylic esters; methacrylic esters; N-vinylformamide and N-vinylpyrrolidone. It may be selected from among polymers prepared from non-ionic monomers, preferably used in an amount ranging from 50 to 90 mole %. Particularly preferably according to the invention, the flocculating agent is a polymer prepared from acrylamide.

Also preferably according to the invention, the flocculating agent comprises at least one polymer prepared from at least one anionic monomer selected from among monomers comprising at least one carboxylic acid function; monomer salts comprising at least one carboxylic acid function; monomers comprising at least one sulfonic acid function; monomer salts comprising at least one sulfonic acid function; monomers comprising at least one phosphonic acid function; monomer salts comprising at least one phosphonic acid function. It may be selected from among polymers prepared from anionic monomers preferably used in an amount ranging from 10 to 50 mole %, preferably ranging from 20 to 40 mole %.

As examples of anionic monomers selected for preparing the flocculating agent of the invention, mention can be made of acrylic acid, methacrylic acid, itaconic acid, crotonic acid, maleic acid, fumaric acid, 2-acrylamido-2-methylpropane sulfonic acid, vinylsulfonic acid, vinylphosphonic acid, allylsulfonic acid, allylphosphonic acid, styrenesulfonic acid and the corresponding water-soluble salts. The water-soluble salts of these anionic monomers are typically salts of an alkaline metal, an alkaline-earth metal and ammonium. The particularly preferred anionic monomers are acrylic acid, 2-acrylamido-2-methylpropane sulfonic acid and the corresponding salts thereof.

Also preferably according to the invention, the flocculating agent comprises at least one polymer prepared from at least one cationic monomer selected from among polymers prepared from at least one cationic monomer selected from among diallyldialkyl ammonium salts; acidified or quaternized salts of dialkylaminoalkyl acrylates; acidified or quaternized salts of dialkylaminoalkyl methacrylates; acidified or quaternized salts of dialkyl-aminoalkylacrylamides and acidified or quaternized salts of dialkyl-aminoalkymethacrylamides. It can be selected from among polymers prepared from cationic monomers, preferably used in an amount ranging from 0.01 to 10 mole %, preferably ranging from 0.1 to 4 mole %.

As examples of cationic monomers selected for preparing the flocculating agent of the invention, mention can be made of diallyl dimethyl ammonium chloride (DADMAC), dialkylaminoethyl acrylate (DAAEA), dialkylaminoethyl methacrylate (DAAEMA), acrylamido-propyl trimethyl ammonium chloride (APTAC), methacrylamido-propyl trimethyl ammonium chloride (MAPTAC).

The acidified salts can particularly be obtained via protonation. The quaternized salts can be obtained by reaction with benzyl chloride, methyl chloride (MeCl), aryl and alkyl chlorides or dialkylsulfates such as dimethylsulfate.

According to the invention, the flocculating agent may also comprise at least one polymer prepared from at least one monomer having a hydrophobic nature, preferably a monomer selected from among the esters of acrylic acid comprising an alkyl, arylalkyl or ethoxylated chain; the esters of methacrylic acid comprising an alkyl, arylalkyl or ethoxylated chain; acrylamide derivatives comprising an alkyl, arylalkyl or dialkyl chain; methacrylamide derivatives comprising an alkyl, arylalkyl or dialkyl chain. If a monomer is used having a hydrophobic nature for the preparation of the flocculating agent, the amount thereof may range from 0.001 to 3 mole % relative to the total quantity of monomers.

The polymers used in the method of the invention as sulfonated dispersing agent or else as flocculating agent may be polymers of different forms. In particular, they may be branched polymers, preferably polymers branched at the time of polymerisation of the monomers used for preparation thereof. At the time of polymerisation, it is possible to use a branching or cross-linking agent, and optionally a polyfunctional transfer agent. As branching or cross-linking agent, mention can be made of compounds selected from among methylene-bis-acrylamide (MBA), ethylene glycol diacrylate, polyethylene glycol dimethacrylate, vinyloxyethyl acrylate, vinyloxyethyl methacrylate, triallylamine, glyoxal, compounds of glycidyl ether type such as ethylene glycol diglycidyl ether, compounds comprising at least one epoxy function, trimercaptotriazine, polyvinyl alcohols, polyvinylamines. The amount of branching or cross-linking agent used is generally less than 4% by weight relative to the quantity of monomers.

The preparation of the sulfonated dispersing agent and the preparation of the flocculating agent can be performed independently e.g. via solution polymerisation, gel polymerisation, suspension polymerisation, micellar polymerisation optionally followed by a precipitation step, emulsion polymerisation—aqueous or inverse—optionally followed by a spray drying step. Post-hydrolysis or co-hydrolysis of the formed polymer is also possible. Preferably, polymerisation is free radical polymerisation, preferably inverse emulsion polymerisation or gel polymerisation. Free radical polymerisation may include polymerisation with free radicals generated by means of UV, azo, redox or thermal initiators, and controlled radical polymerisation techniques (CRP) or matrix polymerisation techniques.

At the time of their addition to the aqueous effluent, the sulfonated dispersing agent and the flocculation agent may, independently, be used in liquid form, solid form, in the form of an emulsion (e.g. water-in-oil emulsion), in the form of a suspension, powder, or in the form of a dispersion in oil. When the solid form is used, the full or partial dissolution thereof in water can be obtained using a polymer preparation unit such as the Polymer Slicing Unit (PSU) disclosed in document EP 2 203 245. Preferably, they are added in the form of an aqueous solution.

Advantageously, the sulfonated dispersing agent and the flocculating agent can be added to the aqueous effluent at the time of transport thereof, particularly in lines conveying the effluent towards the storage sites used for dehydration and solidification of the treated tailings. The storage sites may be open-air sites. They may be non-delimited land areas or closed areas e.g. a basin or cell. The steps of the method of the invention for treatment followed by land application of the effluent can be renewed at one same site leading to superimposition of layers of treated tailings. Land application can also be carried out continuously to form a mass of treated tailings from which water has been extracted.

The use of mechanical treatment can be associated with the method of the invention. In particular, said mechanical treatment units are centrifuging, pressing or filtering devices of the treated effluent. Mention can be made of thickeners, centrifuges or hydrocyclones.

The sulfonated dispersing agent and the flocculating agent can be independently added in several additions, in particular alternately or in sequence. Preferably, the dispersant is added at a single time.

The sulfonated dispersing agent and flocculating agent can be added to a line conveying the effluent towards a mechanical treatment unit, or to the effluent leaving said unit when it is conveyed towards a storage site or towards another mechanical treatment unit. The flocculating agent can be added to a line conveying the effluent towards a storage area.

Aside from the addition of at least one sulfonated dispersing agent to the effluent, followed by the addition of at least one agent to flocculate solid particles, the method of the invention may also comprise the separation of all or part of the water from the mixture comprising solid particles, sulfonated dispersing agent and flocculating agent of these solid particles. Preferably, when implementing the method of the invention, the water is separated from the mixture comprising the dispersed, flocculated solid particles.

Separation of the water can particularly be obtained by land application, centrifugation, pressing or filtering. Water separation is preferably performed by land application.

In particularly advantageous manner, separation of the water allows the removal of at least 20% by weight of water contained in the effluent. Preferably, it allows removal of at least 30% by weight of water contained in the effluent. More preferably it allows removal of at least 50% by weight, even 60% by weight of the water contained in the effluent. The amount of water removed is measured 24 h after implementation of the method of the invention. According to the invention, measurement of the quantity of removed water is performed by evaluating net water release (NWR) from the starting effluent, 24 h after treatment according to the method.

According to the method of the invention, it is also possible to measure the moisture content of the final cake obtained with the method of the invention, once the water has been removed. This measurement is generally performed 24 h after implementing the method of the invention.

According to the invention, the net water release or moisture content of the final cake can also be measured after 7 days.

Preferably, according to the invention:
the sulfonated dispersing agent has a molecular weight of between 5,000 and 25,000 g/mol,
the sulfonated dispersing agent is added in an amount by weight ranging from 500 to 2 000 g per tonne of effluent; and
the effluent is effluent from mining extraction, preferably effluent from mining extraction of bituminous sand or oil sand, comprising 20 to 50% by weight of solid particles.

Also preferably according to the invention:
the sulfonated dispersing agent is a copolymer of 2-acrylamido-2-methylpropane sulfonic acid and of at least one non-ionic monomer selected from among acrylamide; methacrylamide; N-monoderivatives of acrylamide; N-monoderivatives of methacrylamide; N,N-derivatives of acrylamide; N,N-derivatives of methacrylamide; acrylic esters; methacrylic esters; N-vinylformamide and N-vinylpyrrolidone,
the sulfonated dispersing agent has a molecular weight of between 5,000 and 25,000 g/mol,
the sulfonated dispersing agent is added in an amount by weight ranging from 500 to 2 000 g per tonne of effluent; and
the effluent is mining extraction effluent, preferably mining effluent from the extraction of bituminous sand or oil sand, comprising 20 to 50% by weight of solid particles.

In addition to a method, the invention also relates to the use of at least one flocculating agent to treat an aqueous effluent comprising solid particles, to flocculate the solid particles previously dispersed by means of at least one sulfonated dispersing agent. Therefore, the invention concerns the use of a flocculating agent to treat an aqueous effluent comprising solid particles, and of a sulfonated dispersing agent. It also concerns the use of at least one sulfonated dispersing agent and at least one agent to flocculate solid particles to treat an aqueous effluent comprising solid particles.

For the uses of the invention, the aqueous effluent, the solid particles, the sulfonated dispersing agent and the agent to flocculate solid particles are such as defined for the method of the invention. The particular, advantageous or preferred characteristics of the method of the invention define particular, advantageous or preferred uses of the invention.

The invention also relates to a composition comprising an aqueous effluent comprising solid particles and at least one sulfonated dispersing agent, and to a composition comprising an aqueous effluent comprising solid particles dispersed by means of at least one sulfonated dispersing agent.

The invention also relates to a composition comprising an aqueous effluent comprising solid particles, at least one sulfonated dispersing agent and at least one flocculating agent, and to a composition comprising an aqueous effluent comprising solid particles dispersed by means of at least one sulfonated dispersing agent and flocculated by means of at least one flocculating agent.

Preferably, the composition of the invention comprises an aqueous effluent comprising solid particles, at least one sulfonated dispersing agent and at least one flocculating agent. Also preferably, the composition of the invention comprises an aqueous effluent comprising solid particles dispersed by means of at least one sulfonated dispersing agent, the dispersed solid particles being flocculated by means of at least one flocculating agent.

According to the invention, the particular, advantageous or preferred characteristics of the method of the invention define particular, advantageous or preferred compositions.

The different aspects of the invention are illustrated by the following examples.

EXAMPLE 1: FLUIDIFICATION OF AN EFFLUENT OF MATURE FINE TAILING TYPE (29.8 WEIGHT % DRY EXTRACT) BY ADDING DISPERSANT

For each test, the adequate volume of dispersant solution was added to 200 g of aqueous effluent and the whole mixture was manually mixed for 30 seconds; viscosity was measured using a BrookField viscometer (rotation speed: 3 rpm).

Dispersant A=sodium polynaphthalene sulfonate
Dispersant B=polyATBS (homopolymer) at 1 500 g/mol
Dispersant C=polyATBS at 5 000 g/mol
Dispersant D=polyATBS at 10 000 g/mol
Dispersant E=poly(acrylic acid) at 2 500 g/mol
ATBS is acrylamide tertiary butyl sulfonic acid.
The dosages are expressed in g/tonne of aqueous effluent.
The results are given in Table 1.

TABLE 1

| Dispersant | Dosage g/T | Viscosity (3 rpm) | % loss of viscosity |
|---|---|---|---|
| None | 0 | 3 900 | 0 |
| A | 100 | 2 600 | 33.3 |
| A | 250 | 2 200 | 43.6 |
| A | 500 | 1 650 | 57.7 |
| A | 750 | 1 350 | 65.4 |
| A | 1 000 | 1 100 | 71.8 |
| B | 100 | 3 500 | 10.3 |
| B | 250 | 3 300 | 15.4 |
| B | 500 | 2 950 | 24.4 |
| B | 750 | 2 550 | 34.6 |
| B | 1 000 | 2 300 | 41.0 |
| C | 100 | 3 300 | 15.4 |
| C | 250 | 2 850 | 26.9 |
| C | 500 | 2 400 | 38.5 |
| C | 750 | 2 050 | 47.4 |
| C | 1 000 | 1 700 | 56.4 |
| D | 100 | 3 400 | 12.8 |
| D | 250 | 3 000 | 23.1 |
| D | 500 | 2 350 | 39.7 |
| D | 750 | 1 850 | 52.6 |
| D | 1 000 | 1 500 | 61.5 |
| E | 100 | 2 550 | 34.6 |
| E | 250 | 790 | 79.7 |
| E | 500 | 70 | 98.2 |
| E | 750 | 10 | 99.7 |
| E | 1 000 | 10 | 99.7 |

These results show that all the dispersants used for the tests allow a significant reduction in the viscosity of the effluent.

EXAMPLE 2: FLOCCULATION OF AN EFFLUENT OF MATURE FINE TAILING TYPE (29.8 WEIGHT % DRY EXTRACT) AFTER ADDITION OF DISPERSANT

For each test, the adequate volume of flocculant solution was added to 200 g of pre-dispersed tailings, and the whole mixture was manually mixed until observation of flocculation and optimal water release. The flocculant used was 30 mol % anionic polyacrylamide. The dosages of dispersant are expressed in g/tonne of tailings. The flocculant dosage for each test was 1 100 g/dry tonne of effluent. The results are given in Table 2.

TABLE 2

| Dispersant | Dispersant dosage | NWR 24 h |
|---|---|---|
| None | 0 | 35.9 |
| A | 100 | 36.6 |
| A | 250 | 40.8 |
| A | 500 | 39.8 |
| A | 750 | 42.9 |
| A | 1 000 | 44.3 |
| B | 100 | 38.3 |
| B | 250 | 38.5 |
| B | 500 | 36.2 |
| B | 750 | 37.9 |
| B | 1 000 | 38.5 |
| C | 100 | 41.9 |
| C | 250 | 40.8 |
| C | 500 | 42.8 |
| C | 750 | 43.5 |
| C | 1 000 | 40.2 |
| D | 100 | 44.5 |
| D | 250 | 42.2 |
| D | 500 | 44.1 |
| D | 750 | 45.8 |
| D | 1 000 | 43.6 |
| E | 100 | Flocculation impossible |
| E | 250 | Flocculation impossible |
| E | 500 | Flocculation impossible |
| E | 750 | Flocculation impossible |
| E | 1 000 | Flocculation impossible |

The net water release (NWR) corresponds to the total quantity of water recovered during the flocculation test less the quantity of water unduly added at the time of incorporating the aqueous polymeric solution and dispersant solution in the suspension.

These results show that the sulfonated dispersants A, B, C and D allow flocculation of the tailings despite a pre-addition of dispersant. It is also noted that the use of these dispersants leads to better NWR values than the treatment using a flocculant alone. It is also ascertained that the non-sulfonated dispersant E, although efficient in fluidifying the effluents, prevents any subsequent flocculation making use thereof impossible for this application.

The invention claimed is:

1. A method for treating an aqueous effluent comprising fresh tailings, fine tailings, mature fine tailings (MFTs) or mature fine tailings (MFTs) containing clay in amount ranging from 5 to 70% by weight, and comprising solid particles, said method comprising:
   (a) adding at least one sulfonated dispersing agent to the aqueous effluent; and
   (b) adding at least one flocculating agent to flocculate the solid particles;
   wherein the aqueous effluent being treated has left a separation chamber for bitumen separation; and
   wherein the flocculating agent comprises a copolymer prepared from at least one non-ionic monomer and at least one anionic monomer.

2. The method according to claim 1, wherein the sulfonated dispersing agent is added in an amount by weight ranging from 10 to 10 000 g per tonne of effluent.

3. The method according to claim 1, wherein the sulfonated dispersing agent:
   has a molecular weight ranging from 1 000 to 50 000 g/mol; or
   is selected from the group consisting of homo- or co-polymers of 2-acrylamido-2-methylpropane sulfonic acid, vinylsulfonic acid, styrenesulfonic acid, naphthalenesulfonic acid, allylsulfonic acid and the water-soluble salts thereof; or
   is selected from the group consisting of the co-polymers of:
   2-acrylamido-2-methylpropane sulfonic acid, vinylsulfonic acid, styrenesulfonic acid, naphthalenesulfonic acid, allylsulfonic acid or the water-soluble salts thereof, and:
   at least one non-ionic monomer, selected from the group consisting of acrylamide; methacrylamide; N-monoderivatives of acrylamide; N-monoderivatives of methacrylamide; N,N-derivatives of acrylamide; N,N-derivatives of methacrylamide; acrylic esters; methacrylic esters; N-vinylformamide, and N-vinylpyrrolidone.

4. The method according to claim 1, wherein the flocculating agent is added in an amount ranging from 10 to 10 000 g per tonne of solid particles contained in the aqueous effluent.

5. The method according to claim 1 wherein the flocculating agent:
   has a molecular weight ranging from 3 to 40 million g/mol; or
   is a polymer prepared from at least one non-ionic monomer selected from the group consisting of acrylamide; methacrylamide; N-monoderivatives of acrylamide; N-monoderivatives of methacrylamide; N,N-derivatives of acrylamide; N,N-derivatives of methacrylamide; acrylic esters; methacrylic esters; N-vinylformamide and N-vinylpyrrolidone; or
   comprises at least one polymer prepared from at least one anionic monomer, selected from the group consisting of monomers comprising at least one carboxylic acid function; monomer salts comprising at least one carboxylic acid function; monomers comprising at least one sulfonic acid function; monomer salts comprising at least one sulfonic acid function; monomers comprising at least one phosphonic acid function; and monomer salts comprising at least one phosphonic acid function.

6. The method according to claim 1 further comprising the separation of all or part of the water from the mixture of solid particles, sulfonated dispersing agent and agent to flocculate solid particles.

7. The method according to claim 1 further comprising the separation of all or part of the water from the mixture of dispersed, flocculated solid particles.

8. The method according to claim 6 wherein:
   separation of the water is obtained by land application, centrifugation, pressing or filtering; or
   at least 20% by weight of water is separated; or
   separation of water is measured 24 h after treatment.

9. A composition comprising the aqueous effluent, the solid particles, the sulfonated dispersing agent and the agent to flocculate solid particles according to the method of claim 1.

10. A composition comprising an aqueous effluent comprising fresh tailings, fine tailings, mature fine tailings (MFTs) or mature fine tailings (MFTs) containing clay in an amount ranging from 5 to 70% by weight, and comprising solid particles, and at least one sulfonated dispersing agent; or an aqueous effluent comprising fresh tailings, fine tailings, mature fine tailings (MFTs) or mature fine tailings (MFTs) containing clay in an amount ranging from 5 to 70% by weight, and comprising solid particles dispersed by at least one sulfonated dispersing agent;

and at least one flocculating agent; or the dispersed solid particles of which are flocculated by at least one flocculating agent, wherein the aqueous effluent has left a separation chamber for bitumen separation; and wherein the flocculating agent comprises a copolymer prepared from at least one non-ionic monomer and at least one anionic monomer.

\* \* \* \* \*